US009411174B2

(12) United States Patent
Burt et al.

(10) Patent No.: US 9,411,174 B2
(45) Date of Patent: Aug. 9, 2016

(54) ELECTRONICALLY SWITCHABLE OPTICAL DEVICE WITH A MULTI-FUNCTIONAL OPTICAL CONTROL APPARATUS AND METHODS FOR OPERATING THE SAME

(75) Inventors: Damien P. Burt, Akron, OH (US); Bahman Taheri, Shaker Heights, OH (US); Tamas Kosa, Hudson, OH (US); Michael C. Prechel, Getzville, NY (US)

(73) Assignee: ALPHAMICRON INCORPORATED, Kent, OH (US)

( * ) Notice: Subject to any disclaimer, the term of this patent is extended or adjusted under 35 U.S.C. 154(b) by 33 days.

(21) Appl. No.: 13/639,523

(22) PCT Filed: Apr. 5, 2011

(86) PCT No.: PCT/US2011/031181
§ 371 (c)(1),
(2), (4) Date: Nov. 8, 2012

(87) PCT Pub. No.: WO2011/127015
PCT Pub. Date: Oct. 13, 2011

(65) Prior Publication Data
US 2013/0048836 A1 Feb. 28, 2013

Related U.S. Application Data

(60) Provisional application No. 61/320,920, filed on Apr. 5, 2010.

(51) Int. Cl.
*G02C 7/10* (2006.01)
(52) U.S. Cl.
CPC ..................... *G02C 7/101* (2013.01)

(58) Field of Classification Search
CPC ..................... G01J 1/42; H04N 1/00
USPC ............ 250/214 AL, 221, 216, 226, 214 SW, 250/214 R
See application file for complete search history.

(56) References Cited

U.S. PATENT DOCUMENTS 3,109,132 A 10/1963 Witte
3,829,332 A 8/1974 Iizuka et al.
(Continued)

FOREIGN PATENT DOCUMENTS

JP 1986-304961 12/1986 ............... G02C 7/10
JP 63157128 6/1988 ............... G02C 7/10
(Continued)

OTHER PUBLICATIONS

International Search Report mailed Jul. 1, 2011 in corresponding application PCT/US2011/031181.

*Primary Examiner* — Pascal M Bui Pho
*Assistant Examiner* — Mitchell Oestreich
(74) *Attorney, Agent, or Firm* — Renner Kenner Greive Bobak Taylor & Weber

(57) ABSTRACT

An electronically controllable optical device is provided which includes a cell maintaining an electro-optically controllable material, a photosensor associated with the cell, wherein the photosensor generates an input signal based on ambient light level, and a control circuit which receives the input signal and generates at least one output signal received by the cell. The device also includes a single switch connected to the control circuit, wherein actuation of the switch in predetermined sequences enables at least two of the following features of the device, a state change of the material, a system change between auto and manual modes, or a threshold value change for generation of the ambient light input signal, a device color change, a device tint change or a reset of the threshold value to the original factory setting. Methods of operation for the device are also provided. A control apparatus for the device is also disclosed.

23 Claims, 9 Drawing Sheets

(56) References Cited

U.S. PATENT DOCUMENTS

| | | | |
|---|---|---|---|
| 4,084,123 A | 4/1978 | Lineback et al. | 320/2 |
| 4,191,917 A | 3/1980 | Brown et al. | 320/2 |
| 4,279,474 A | 7/1981 | Belgorod | 350/331 R |
| 4,300,818 A | 11/1981 | Schachar | 351/7 |
| 4,415,843 A | 11/1983 | Feldman | 318/139 |
| 4,416,595 A | 11/1983 | Cromie | 417/476 |
| 4,508,105 A | 4/1985 | Whitten et al. | 128/1 |
| 4,804,949 A * | 2/1989 | Faulkerson | 345/166 |
| 5,015,086 A | 5/1991 | Okaue et al. | 351/44 |
| 5,081,542 A | 1/1992 | Efron et al. | 359/41 |
| 5,114,218 A * | 5/1992 | Black et al. | 351/44 |
| 5,260,636 A | 11/1993 | Leiserson et al. | 320/2 |
| 5,276,539 A * | 1/1994 | Humphrey | 349/14 |
| 5,583,744 A | 12/1996 | Oguchi et al. | 361/683 |
| 6,007,939 A | 12/1999 | Clowers | 429/99 |
| 6,117,576 A | 9/2000 | Sugai | 429/7 |
| 6,495,987 B2 | 12/2002 | Kuo et al. | 320/107 |
| 7,355,161 B2 * | 4/2008 | Romig et al. | 250/221 |
| 7,425,066 B2 * | 9/2008 | Blum et al. | 351/159.39 |
| 2008/0013000 A1 * | 1/2008 | Park | A61F 9/023 349/13 |
| 2008/0239452 A1 * | 10/2008 | Xu et al. | 359/265 |

FOREIGN PATENT DOCUMENTS

| | | | | |
|---|---|---|---|---|
| WO | WO 92/10130 | | 6/1992 | G02C 7/10 |
| WO | WO 2008/118967 A1 | | 10/2008 | G02C 5/00 |

\* cited by examiner

| SUB_CELL 1 | SUB_CELL 2 | RESULTANT COLOR |
|---|---|---|
| CLEAR | CLEAR | CLEAR |
| CLEAR | BLUE | BLUE |
| AMBER | CLEAR | AMBER |
| AMBER | BLUE | GREY/NEUTRAL |

Fig. 6A

| SUB_CELL 1 | SUB_CELL 2 | RESULTANT COLOR |
|---|---|---|
| CLEAR | CLEAR | CLEAR |
| CLEAR | COLOR 2 | COLOR 2 |
| COLOR 1 | CLEAR | COLOR 1 |
| COLOR 1 | COLOR 2 | COLOR 1 + COLOR 2 |

Fig. 6B

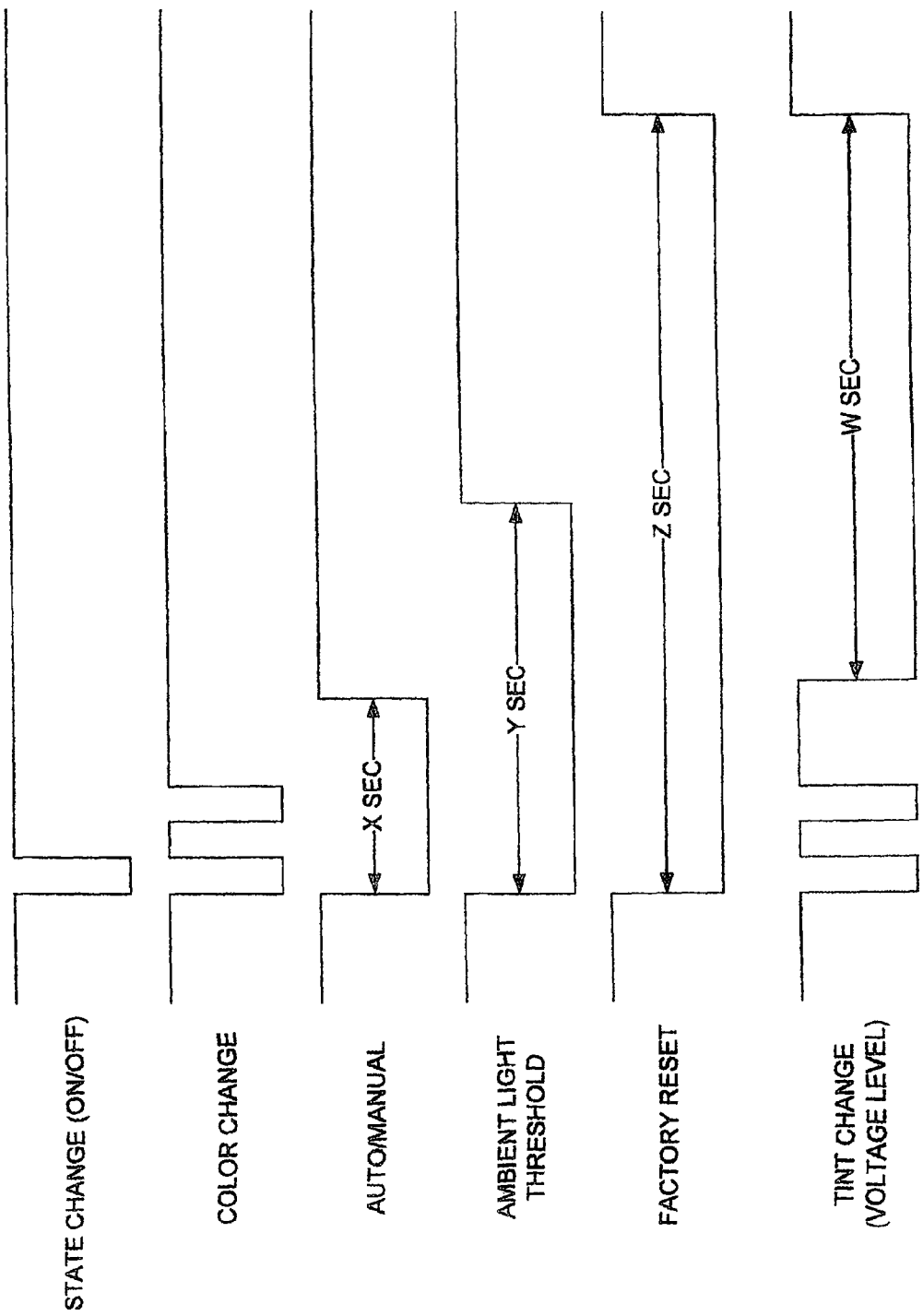

ELECTRONICALLY SWITCHABLE OPTICAL DEVICE WITH A MULTI-FUNCTIONAL OPTICAL CONTROL APPARATUS AND METHODS FOR OPERATING THE SAME

RELATED APPLICATIONS

This is a §371 application of International patent application number PCT/US2011/031181 filed Apr. 5, 2011, which claims the benefit of U.S. Provisional Patent Application Ser. No. 61/320,920, filed Apr. 5, 2010, both of which are incorporated herein by reference.

TECHNICAL FIELD

The present invention is directed to an electronically controllable optical device incorporating a multi-functional control apparatus and methods for operating said optical device.

BACKGROUND ART

Electro-optic materials exhibit optical properties that can be altered by application of an electric field, current, or other electromagnetic fields. The most common of these materials are liquid crystals, electrochromic, and Kerr materials. Changes in the absorption properties of these materials can be utilized to make electronically controllable devices such as electronically controllable eyewear, goggles, visors, and welding masks. An example of these devices are the E-TINT® (liquid crystal device (LCD) with electronically controlled tint) based ski goggles sold by the sporting goods manufacturer UVEX® and its affiliates or autodimming filters sold for welding helmets. In the ski goggle product, a switch is used to change the state of the system from clear to dark in the energized state and from dark to clear in the unenergized state. For welding helmets, there is a photosensitive cell, such as a photodiode, photoresistor, solar cell, etc. (collectively named photosensor), which causes application of a voltage to the device when there is sufficient light from the welding arc to activate the device and induce a state change in the material. Once the arc is off, the device returns to the un-energized state. Therefore, currently, to our knowledge, there are commercial systems that provide either manual or automatic control of the optical device but not both within the same device.

One desired feature of electronically controllable optical devices is to give the user of such devices control over many functions in a simple fashion while the user is still "wearing" the device. For example, it is desirable to give the operator the ability to change the state of the device from clear to dark (or colored) as well as the ability to change other features of the device, e.g. the ability to switch between manual and automatic modes. Other operational modes can also be controlled, such as: the ability during the automatic operation mode to set the level of light that can cause a state change (i.e. the sensitivity of the photosensor to the ambient light level), the ability to change the color if the device has multiple color modes, the ability to adjust the "darkness" level of the device, and/or the ability to return the system to its original factory setting.

The method that is currently used to achieve all these functions is to provide multiple switches on the optical device. This approach, however, is commercially cumbersome and undesired since it introduces bulk, weight, cost, and potential for error. In particular, in some optical applications such as eyewear, there are significant size limitations which can severely hinder the ability to include multiple switches within the eyewear frame. Another problem with multiple switches is operator error if the wrong switch is pressed, especially since in most applications, the switch needs to be operated while the user is wearing the eyewear so the user must rely on a tactile response because the switch is out of eyesight. This is especially important in environments where the operator has only a short response time (e.g. military setting, sports, etc.). Another factor is that the user may only have one free hand and therefore operation of multiple switches can become cumbersome.

Therefore, there is a need in the art for an electronically controllable optical device that has a control apparatus that can provide multiple-function control over the optical device in a "blind" fashion (without the need for the operator to see which switch they are activating). One way to achieve this, as described below, is to create a system in which a single switch is coded to provide multiple functions needed.

SUMMARY OF THE INVENTION

An electronically controllable optical device includes a cell maintaining an electro-optically controllable material; a photosensor associated with the cell, wherein the photosensor generates an input signal based on the ambient light level; a control circuit receiving the input signal and generating at least one output signal received by the cell; and a switch connected to the control circuit. Actuation of the switch in a predetermined sequence enables at least two functions selected from the following: (i) a state change of the electro-optically controllable material; (ii) a system change between an auto mode and a manual mode; (iii) a change in the threshold value for generation of the input signal when in the auto mode; or (iv) a reset of the threshold value to a factory setting.

In one embodiment, actuation of the switch in a predetermined sequence enables at least three functions selected from the functions (i) to (iv) recited above.

In another embodiment, actuation of the switch in a predetermined sequence enables all four functions selected from the functions (i) to (iv) recited above.

In another embodiment, actuation of the switch enables a state change of the electro-optically controllable material while either in the auto mode or the manual mode.

In some embodiments, the device cell is made up of at least two sub-cells, wherein each sub-cell has a clear state and a color state. In such a device, actuation of the switch in another predetermined sequence enables a device color change. The device color change is achieved by changing the state of each sub-cell from its clear state to its color state. In one example, where the device has at least two sub-cells, the device color change includes changing the device color between at least a first color, a second color and a third color. So the color change sequence toggles between a first color where the first sub-cell is in a color state and the second sub-cell is clear, a second color where the first sub-cell is clear and the second sub-cell is in a color state, and a third color where both the first and second sub-cells are in a color state.

In a device with at least two sub-cells, actuation of the switch in yet another predetermined sequence can achieve a device tint change. The device tint change includes changing a voltage supplied to at least one of the sub-cells (when the sub-cell is activated) so as to change a darkness level of the sub-cell when the sub-cell is in a color state.

In other embodiments, the device includes one cell and actuation of the switch enables a device tint change. The device tint change includes changing a voltage supplied to that one cell when the cell is activated so as to change a darkness level of the cell when the cell is in a color state.

In some embodiments, the single switch is movable from an open condition to a closed condition such that the single switch is biased to return to the open condition.

Any predetermined sequence can be chosen for operation of the single switch to enable any one or more of the functions recited above.

In one embodiment, actuation of the switch in a series of predetermined sequences enables the following operational features: (i) a state change of the electro-optically controllable material; (ii) a system change between an auto mode and a manual mode; (iii) a device color change; (iv) a change in the threshold value for generation of the input signal when in the auto mode; and (v) a reset of the threshold value to a factory setting.

Also described herein is a method of controlling an electronically switchable optical device. The method includes providing a cell with an electro-optically active material, a photosensor associated with the cell that can generate an ambient light input signal based on a threshold ambient light level, a control circuit that receives the ambient light input signal, and a switch connected to the control circuit. The method continues by actuating the switch in a predetermined sequence to enable two or functions selected from: (i) a state change of the electro-optically active material; (ii) a system change between an auto mode and a manual mode; (iii) a change in the threshold ambient light level for generation of the ambient light input signal when in the auto mode; or (iv) a reset of the threshold ambient light level for the generation of the ambient light input signal to a factory setting.

In one embodiment, the method includes pressing and releasing the switch in a first predetermined period of time to obtain a first operational feature; pressing and releasing the switch twice within a second predetermined period of time to obtain a second operational feature; and pressing and holding the switch for a third period of time to obtain a third operational feature.

In some embodiments, the method also allows for pressing and releasing the switch and then pressing and holding the switch within another predetermined period of time and holding the switch for yet another period of time to obtain a fourth operational feature. The control circuit may associate any one of the above operational features with a state change of the electro-optically controllable material, a system change between an auto mode and a manual mode, a threshold value change for generation of the ambient light input signal, and a reset of the threshold value for generation of the ambient light input signal to a factory setting.

In some embodiments, the cell is provided with at least two sub-cells, each sub-cell having a clear state and a color state. The method allows for changing of the state of the electronically controllable material of any one of the sub-cells from any one of the clear and color states to any one of the other clear and color states. Accordingly, the method provides for actuating the single switch in another predetermined sequence to change each sub-cell between its clear state and its color state to obtain a device color change. In some embodiments, the device color change comprises changing the device color between at least a first color, a second color and a third color.

In some embodiments, the method associates by the control circuit one of the operational features with resetting the threshold value and changing the state of the electro-optically controllable material while either in the auto mode or the manual mode.

In one embodiment, the method provides for actuating the switch in a series of predetermined sequences to enable the following functions: (i) a state change of the electro-optically controllable material; (ii) a system change between an auto mode and a manual mode; (iii) a device color change; (iv) a change in the threshold value for generation of the input signal when in the auto mode; and (v) a reset of the threshold value to a factory setting Also described herein is a multi-functional control apparatus for controlling an electronically switchable optical device. The apparatus includes a photosensor that generates an ambient light input signal; a switch that generates a switch signal, wherein the switch is actuable in predetermined sequences, and a control circuit adapted for use with the optical device. The control circuit receives the ambient light input signal and the switch signal. Actuation of the switch enables a state change of the optical device. And, the predetermined sequences and a predetermined value of the ambient light signal enable at least two of the following features of the optical device: a system change between an auto mode and a manual mode, a threshold setting for generation of the ambient light input signal, or a reset of the threshold setting to a factory setting.

In one embodiment, the device includes at least two sub-cells and actuation of the switch in another predetermined sequence enables a device color change by changing the state of the two sub-cells in the device.

BRIEF DESCRIPTION OF THE DRAWINGS

These and other features and advantages of the present invention will become better understood with regard to the following description, appended claims, and accompanying drawings wherein:

FIGS. 6A and 6B are diagrams and tables showing examples of various color states when the optical device has two sub-cells;

FIG. 9 is a diagrammatical representation of the flow chart in FIG. 8, showing an example of the various actuation sequences of the multi-functional control apparatus and the operational states associated with each sequence.

DESCRIPTION

Figure 1:
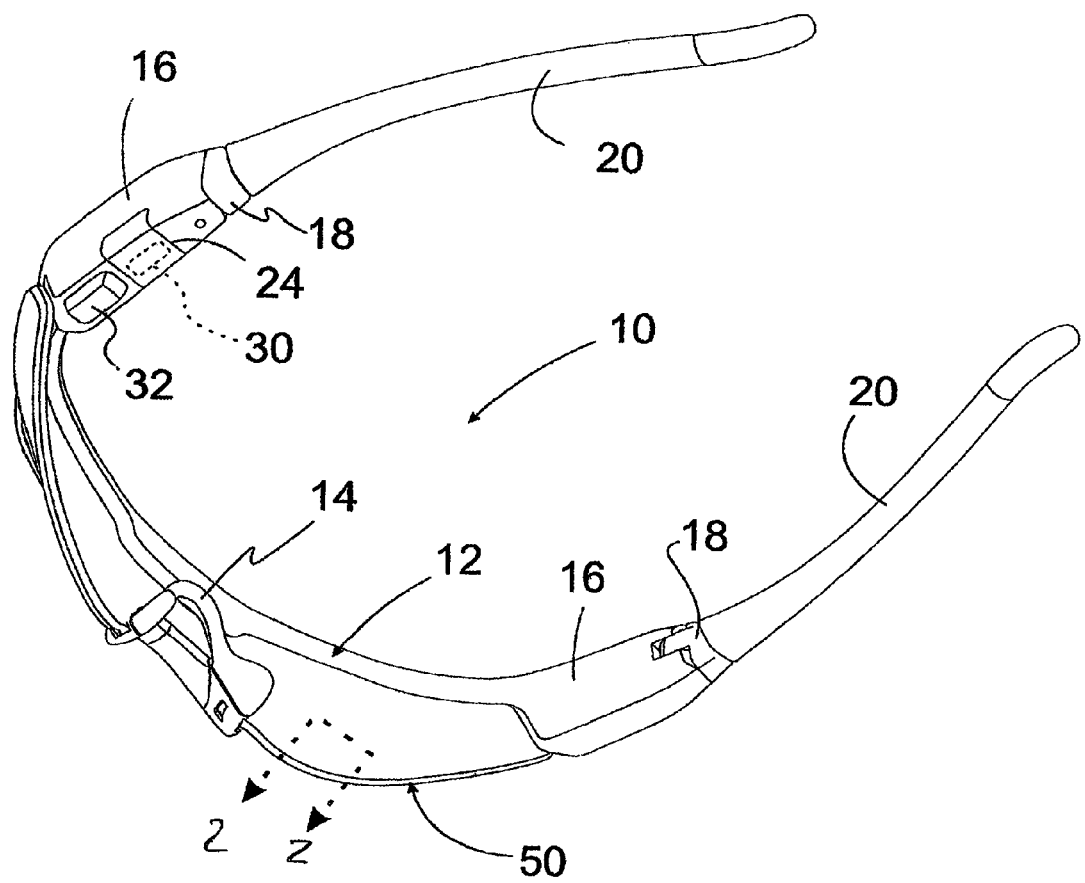
FIG. 1 is a bottom perspective view of an optical device such as eyewear which is made according to the concepts of the present invention.

The structures shown schematically in the drawings have parts that are examples of the elements recited in the claims.

The illustrated structures thus includes examples of how a person of ordinary skill in the art can make and use the claimed invention. It is described here to meet the enablement and best mode requirements of the patent statute without imposing limitations that are not recited in the claims.

The present invention relates to an electronically switchable optical device (ESOD) containing a multi-functional control apparatus (MCA), a multi-functional control apparatus (MCA) for use with an ESOD, and a method for controlling an ESOD to affect various operational features, as described below.

The ESOD may be in the form of eyewear such as goggles, sunglasses, opthalmic lenses, visor whose transmission can be changed, as will be described in detail below. One example of an ESOD is shown in FIG. 1 and generally designated by the numeral 10.

The device 10 includes a frame 12 which may include a nose bridge 14 separating two viewing areas. Those skilled in the art will appreciate that the eyewear may be in the form of a single curved, substantially semi-hemispherical lens which extends over both the user's eyes or the eyewear may include two separate lenses, one associated with each eye. The nose bridge 14 may be formed by the frame, other material or the lens may be shaped accordingly. The frame may further include flanges 16 which extend from either side of the frame and are integral therewith. At the end of each flange 16 is a hinge 18 which interconnects to a temple 20. Although the hinges 18 are shown interconnecting the flanges with the temples in the present embodiment, it will be appreciated that the hinges may be configured such that the flanges and temples are integral pieces and the hinges connect the flanges to the frame. In an alternative embodiment, the frame, flanges and temples could comprise a single integral piece.

In this example, the optical device 10 is battery operated. The battery may be rechargeable through a port 30 which is located on the underside of the flange 16 under a flap 24. The port 30 may be in any configuration known in the art, e.g. a USB, micro USB or a mini-USB connector or plugs, so as to allow for recharging of a battery that is carried within the flange 16. In other embodiments it will be appreciated that the battery may be a replaceable battery of appropriate size, or it may be chargeable in a wireless fashion. Wireless charging uses a charging station or a charging mat that plugs into the outlet of a home. This station/mat generates an electromagnetic field. The eyewear would then incorporate a coil of wire that "connects" to the electromagnetic field and uses the energy supplied by the field to charge the battery. The eyewear literally sits on the station/mat (encompassed by the field) and charges up. Thus, in such an example, there is no need to plug the eyewear into anything and no need for a port.

Also on the underside of the flange 16 is a switch 32. The positioning of the port 30 and the switch 32 on the underside of the flange 16 provides one example; however, it will be appreciated that the port 30 and/or switch 32 can be located anywhere on the body of the device such as on any side of the hinge 18 and/or any side of the frame 12 or temple 20. In some embodiments, the switch may be remotely positioned. The switch 32 may be a push-button switch, a rotary dial switch, a capacitive-touch switch, or any type of comparable switch known in the art. In the present embodiment, the switch is the only switch provided on the device and is of a type which must be pressed and released in order to actuate or send an appropriate signal. One or more than one switch may be provided. In some embodiments, only a single switch is provided to obtain a number of operational states of the device. In some configurations, the switch is provided with a biasing mechanism which requires the push-button (or dial) to be pressed and then held in place to complete or close a circuit. Pressing and then releasing the button may also be referred to as a "click." By using either a press and release, or a press and hold for various periods of time, a single switch can be used to initiate different operational features of the device. As a result, the single-switch configuration is suited for optical devices where space is limited, or where the operator may only have one hand free (e.g. in a combat situation or in sports).

The frame 12 also carries a photosensor 40 (not shown) which may be positioned anywhere on the optical device as long as it is exposed to the ambient light. As will be discussed in further detail, the photosensor 40 generates an ambient light signal 42 which is received by a control circuit 48 maintained in the flange 16 or other part of the frame 12.

Figure 2:
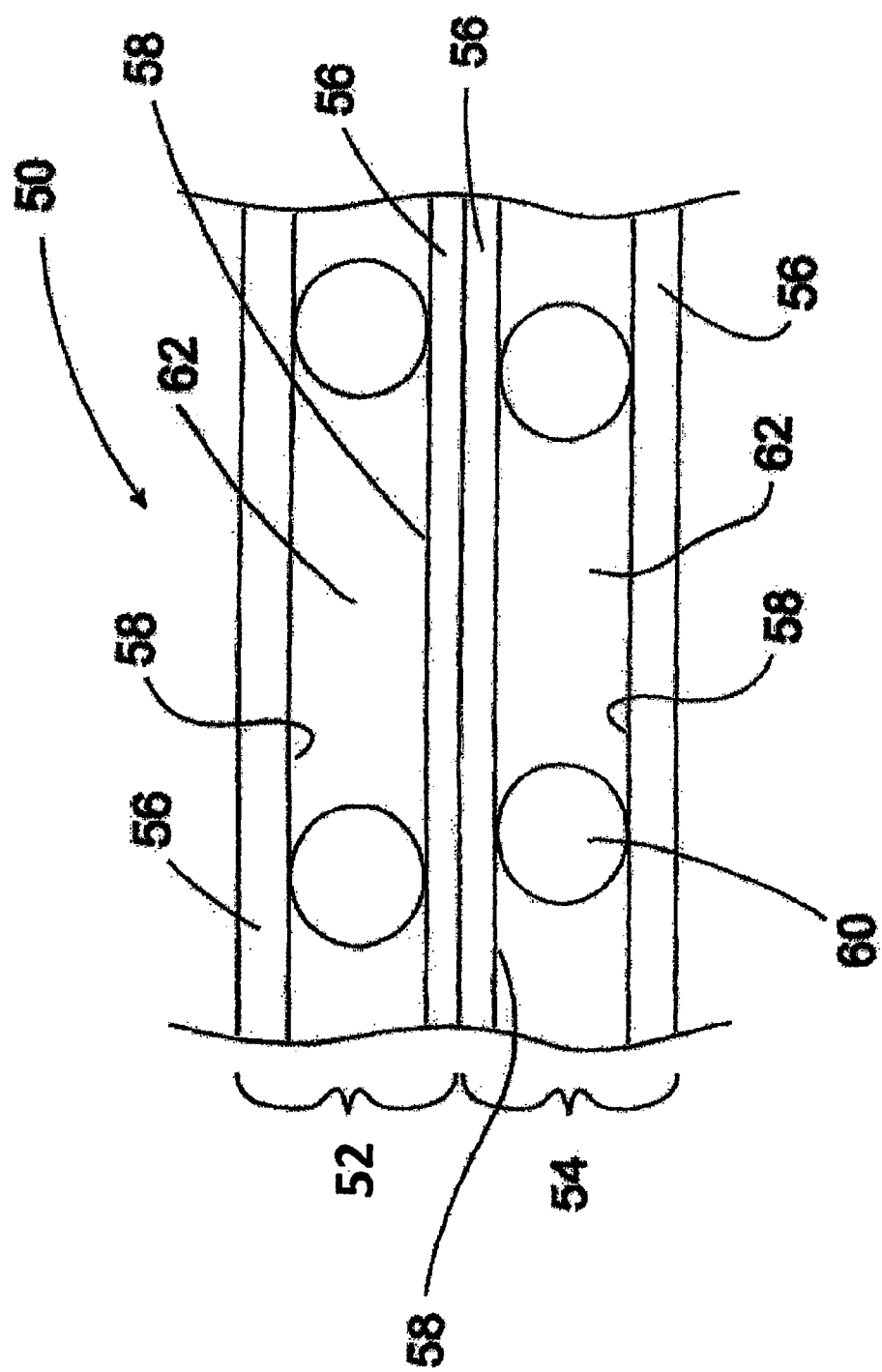
FIG. 2 is a cross-sectional view of the optical device taken along lines 2-2 of FIG. 1 showing two sub-cells of the eyewear according to the concepts of the present invention.

The frame 12 carries a cell 50 which maintains an electro-optically active or controllable material that changes states or conditions when a voltage is applied and/or when a voltage is removed. State change as used herein refers to a change from a higher to a lower light transmittance state, or vice versa. It will further be appreciated that the electro-optically active material may enable intermediate states to be obtained depending upon the application of a specified voltage value which may be associated with the amount of ambient light detected by the photosensor 40. In the present example, the cell 50 consists of a two-cell construction, but it will be appreciated that the present invention is applicable to a single cell or to a construction where more than two cells are utilized. Accordingly, as seen in FIG. 2, the cell 50 may comprise a sub-cell 52 and a sub-cell 54. Each sub-cell provides two spaced-apart substrates 56, each of which has an interior facing surface 58. As appreciated by skilled artisans, the interior facing surfaces may be coated with electrodes and other surface treatments suitable for controlling electro-optically active material. In some embodiments, spacers 60 may be disposed between the substrates so as to maintain a controlled distance between the facing surfaces. It will further be appreciated that the facing surfaces of adjacent substrates that form a sub-cell are sealed at their respective peripheries so as to maintain the electro-optically active material between the substrates.

An electro-optic material 62, which may include liquid crystal materials, dyes and/or polymeric material, is received between the substrates 56. Skilled artisans will appreciate that the electro-optic material may be a fluid, a film or combinations thereof. In some embodiments, electro-optically active material other than liquid crystal, such as electrochromic or Kerr materials, may be maintained between the substrates 56. In any event, application of an electric field between the substrates controls the state or condition of the electro-optic material 62. In one embodiment, where no voltage is applied, the material has its highest light transmittance, referred to as a "clear" state, and when a predetermined voltage is applied to the material, the material changes to a lower light transmittance state, referred to as a "dark," "tinted" or "colored" state. A change in the state is defined as a change from a clear state to a dark or colored state, and vice versa, as a result of the application of voltage to a cell.

Figure 3:
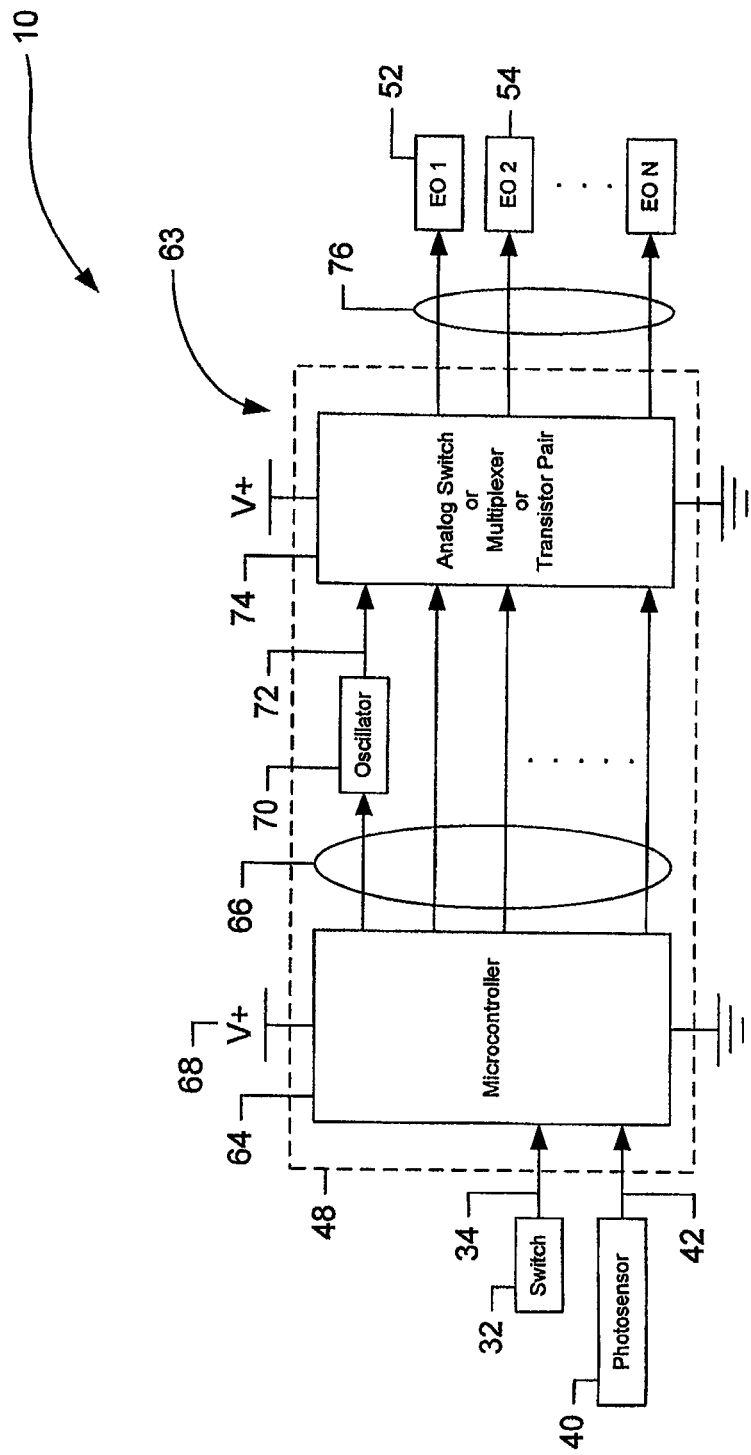
FIG. 3 is a schematic diagram of a multi-functional optical control apparatus with a control circuit implemented in the optical device according to the concepts of the present invention.

FIG. 3 shows an example of an MCA 63 associated with device 10. The MCA 63 includes a control circuit 48 which receives input from the switch 32 in the form of a switch signal 34 and from the photosensor 40 in the form of an ambient light input signal 42 (an input signal based on the ambient light level). Specifically, the signals 34 and 42 are received by a microcontroller 64 maintained within the control circuit 48 which provides the necessary hardware and software for implementing operation of the device 10. The microcontroller 64 generates controller signals 66. The microcontroller 64 receives the needed voltage from a power supply 68 which is connected to the rechargeable battery port 30. In other examples, the power supply may be a replaceable battery or a solar cell maintained by the frame 12. One of the controller signals 66 is received by an oscillator 70 which generates a timing signal 72. The timing signal 72 and other controller signals 66 are received by an analog switch or multiplexer 74 which generates output signals 76 so as to operate the sub-cells 52, 54 and any other cells that may be associated with the device 10. As shown in FIG. 3, the cells 52 and 54 are respectively identified as EO 1 and EO 2, wherein EO designates an electro-optic cell as described herein.

In general, the device 10 operates in the following manner when in an AUTO mode. The photosensor 40 monitors an ambient light level. When a bright ambient light is detected, such as sunlight, an appropriate input signal 42 is generated and received by the microcontroller 64, which in turn will generate an appropriate signal so as to change the state of at least one of the sub-cells to a colored state from a clear state. When the detected ambient light drops below a predetermined threshold value, then the microcontroller generates a controller signal to cause the cell or sub-cells to return to a clear state. In some embodiments, actuation of the switch in a certain manner can change the threshold value of the photo sensor such that the input signal 42 is generated at a lower or higher ambient light level. Initially, the microcontroller 64 is provided with a factory value (factory setting) that sets the threshold value for the photosensor 40. In some embodiments, the user can reinstate the factory setting by actuating the switch in a certain manner.

The various functions that the user can enable by actuating the switch are set out as follows:

The use can effect a "state change" in the eyewear to go from a clear state to a dark or colored state and vice versa. The state change can be controlled either manually (MANUAL mode) or automatically (AUTO mode). When in a MANUAL mode, the user can affect a state change by actuating the switch in a predetermined sequence 1.

The user can also choose between MANUAL or AUTO mode by actuating the switch in a predetermined sequence 2. This is referred to as a "system change." However, when the device is in an AUTO mode, actuation of the switch in the predetermined sequence 1 will bring the system out of AUTO mode back to MANUAL mode.

When in AUTO mode, the user may want to alter the threshold setting at which the photosensor generates the input signal, i.e. the level of ambient light necessary to affect a state change. This is referred to as "THRESHOLD setting" The user can do this by actuating the switch in a predetermined sequence 3. In one example, the user presses and holds the switch for a predetermined time Y to set the threshold level.

If the user has altered the threshold setting but wishes to return to the FACTORY SETTING, the user can actuate the switch in a predetermined sequence 4. For example, the user can reinstate the FACTORY SETTING by pressing and holding the switch for a predetermined time Z.

In some examples, the device may have two or more sub-cells, each having a different color. The user can then toggle between the colors (COLOR CHANGE) by actuating the switch in a predetermined sequence 5. Color change is achieved by changing the state of each sub-cell from clear to colored. For example if one sub-cell is amber and the other sub-cell is blue, the colors can be switched from amber (amber sub-cell is in colored state, blue sub-cell is clear), to blue (amber sub-cell is clear, blue sub-cell is in colored state) or grey (both amber and blue sub-cells are in colored state). This is shown in FIG. 6A.

In some examples, the user can then adjust the "darkness" of the cell or sub-cells in any given light. Some users may refer a "darker" setting while some may prefer a "lighter" setting. This is referred to as "TINT change." The user can actuate the switch in a predetermined sequence 6 to change the voltage signal supplied to the cell (TINT change) so it can be set "darker" or "lighter" when in a particular ambient light environment.

It will be appreciated that predetermined sequences 1-6 may be determined in any manner known to people of skill in the art. Below are some examples of how the predetermined sequences have been implemented.

Example 1

Figure 4:
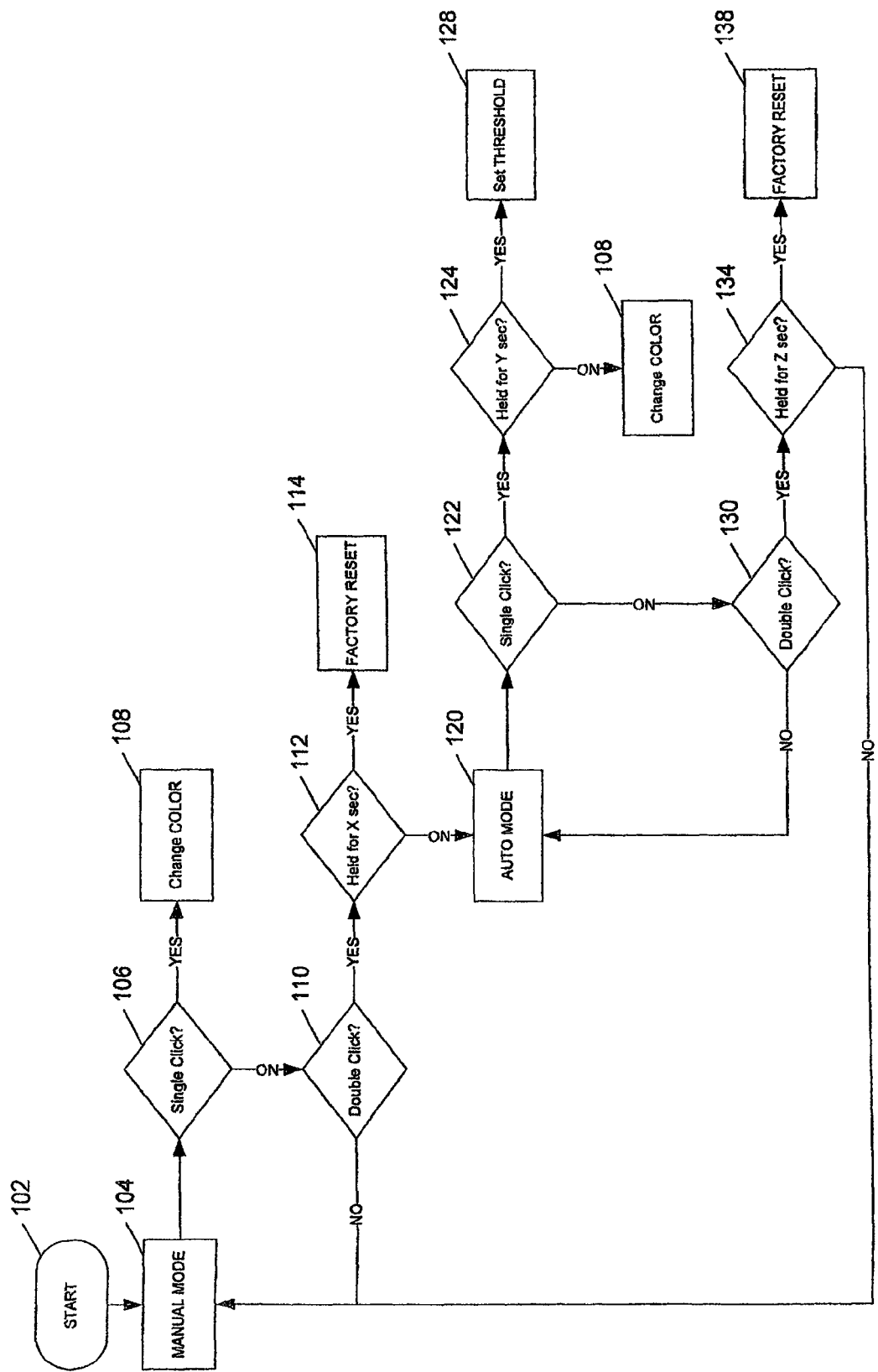
FIG. 4 is an operational flowchart showing the steps implemented by the control circuit according to the concepts of the present invention.

Referring now to FIG. 4, one example of an operational flowchart for operation of the MCA is designated generally by the numeral 100. It will be appreciated that the operational flowchart is embodied in software maintained by the microcontroller 64 of the control circuit 48. Initially, at a start designation 102, the device is switchable to various features with only the use of a single user-actuable switch. Accordingly, the device starts in a manual mode 104 and awaits detection of a switch actuation. The switch actuation may be in the form of a press and release of the switch 32, also referred to as a single click. A "double click" consists of a press and release of the switch followed shortly thereafter of another press and release. It is appreciated that the double click must be distinguished by the electronics from a single click. This can be achieved by controlling the timing needed between the two press and releases. In some instances, a function or operation of the device may be initiated by a single or double click followed by a press and hold of the button. The time period between what constitutes a double click operation may vary as needed in the microcontroller. In any event, upon detection of a single click at step 106, the methodology indicates that it is a desire of the user to change the state of the cell 50 and the process proceeds to step 108 which will be described in detail later. However, if a single click is not detected, the process proceeds to step 110 to determine whether a double click is detected or not. If a double click is not detected, then the process returns to the manual mode. However, if a double click is detected at step 110, the process proceeds to step 112 wherein the microcontroller determines whether the switch is being pressed and held for a predetermined x period of time, e.g. such as 20 seconds. Skilled artisans will appreciate that this period of time may be adjusted as appropriate. In any event, if at step 112 it is determined that the switch is held for the designated period of 20 seconds then the microcontroller initiates a factory reset procedure at step 114. During the factory reset procedure, the threshold value of the photosensor 40 is reset to a factory-established value.

At step 112, if the button is released prior to expiry of the predetermined period of time, then the device goes into an AUTO MODE at step 120. Additionally, upon following step 110, the user is able to set the ambient light threshold level for effecting a state change as needed by. Accordingly, once in the auto mode 120, if a single click is detected at step 122 and the button is then subsequently pressed and held for a predetermined y period of time, such as 5 seconds, then the threshold value for the photosensor 40 is adjusted at step 128. In addition to the direct change when the threshold value is set, the microcontroller 64 can take the light level, in the form of a voltage value, and create two thresholds, an upper threshold and a lower threshold. In this manner, the system has hysteresis such that oscillation of the sub-cell does not take place. In other words, the hysteresis is the difference between the upper and lower threshold so that the sub-cell does not rapidly fluctuate between a clear state and a colored state when the ambient light level is at the designated cross-over value. In any event, when the threshold value is set by the user at step 128, the sub-cell flashes between the two states to indicate that a change has occurred. As such, it will be appreciated that the user needs to position the device so that the photosensor detects an ambient light level the user desires for the state of the sub-cell to change between a clear state and a colored state. For example, if the user wants the threshold value to be initiated at a low ambient light signal, the device would be positioned in such an area. Alternatively, if the user wants a high ambient light level to be utilized, they can change the threshold value in direct sunlight.

Returning to step 124, if the switch is not pressed and held for the predetermined period of time, then the process proceeds to the state or color change operation 108 to be described.

Returning to step 122, if a single click is not detected, then the process proceeds to step 130 to determine whether a double click of the switch is detected. If not, then the process returns to step 120 and the device remains in the auto mode. However, if a double click is detected at step 130, then at step 134 it is determined whether the button is pressed and held for a predetermined z period of time, such as 20 seconds, at step 134. If this is the case, then at step 138 a factory reset procedure is initiated at step 138 and the threshold value is reset. However, if at step 134 the button is not held for the predetermined period of time, the process returns to step 104 and the device enters the manual mode.

Figure 5:
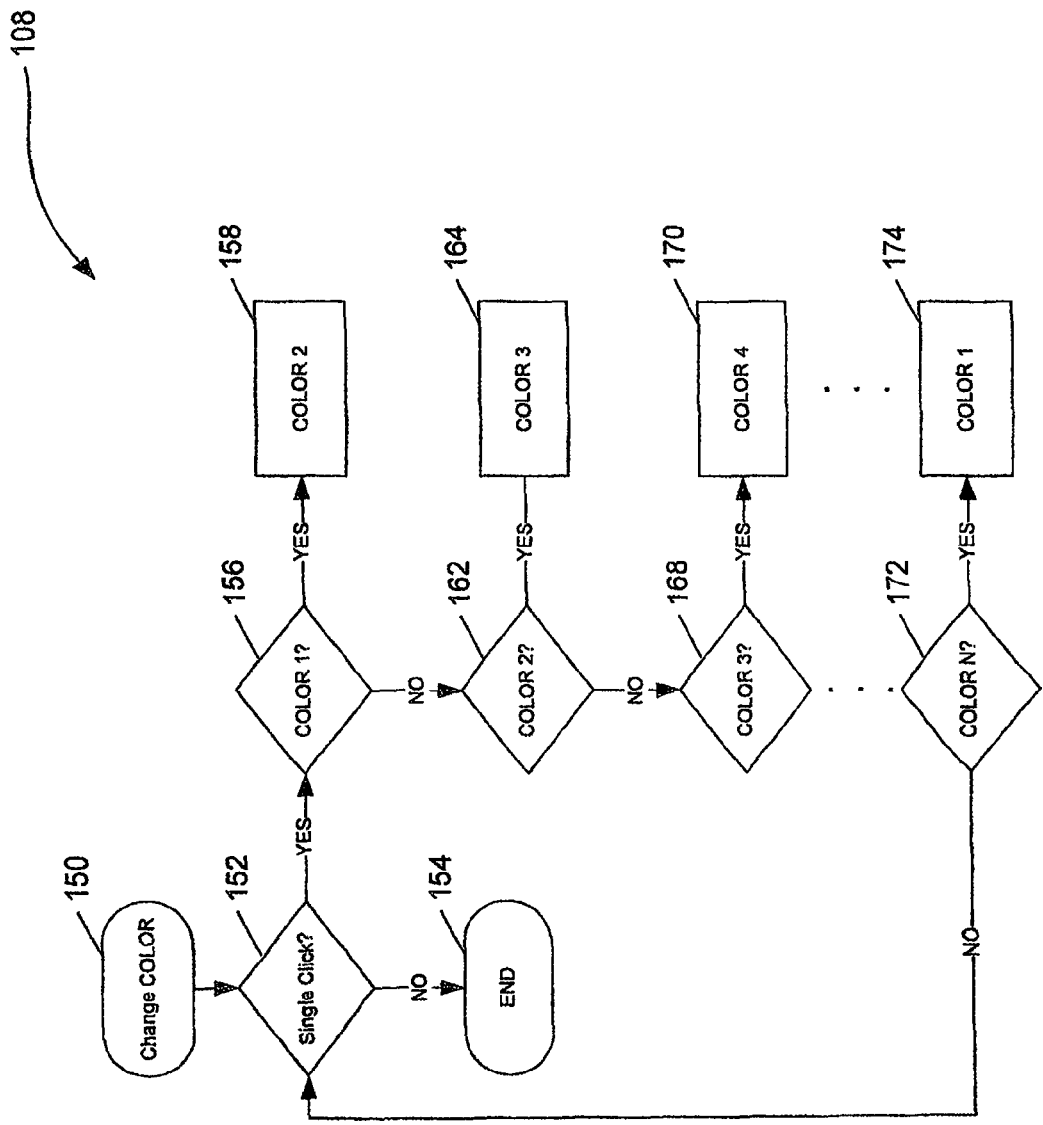
FIG. 5 is an operational flowchart showing adjustment of an operational state, such as various colors, utilized in the optical device according to the present invention.

Referring now to FIG. 5, the state change, which in this example is also referred to as a color change process is shown and is designated generally by the numeral 108. In the embodiment disclosed, there are two liquid crystal sub-cells and, as such, there are four possible color conditions that may be employed. Color 1 is the condition where both sub-cells are in a clear condition, color 2 is where only one sub-cell is in a tint condition and the other sub-cell is clear, color 3 is where the first sub-cell is in a clear condition and the other sub-cell is in a tint condition and color 4 is where both sub-cells are in a tint condition. Accordingly, in one example, color 2 could be an amber tint, color 3 could be a blue tint and color 4 could be a combination of blue and amber so as to provide a third colored condition. These color conditions are also shown in FIGS. 6A and 6B.

The process 108 starts at step 150. Next, at step 152, it is determined whether a single click is detected or not. Generally, a single click will toggle between the four color states (three color states and a clear state). Accordingly, if a single click is not detected, then at step 154 the change state operation ends and the process returns to the main operation. However, if a single click is detected at step 152, then at step 156 the current state or color of the cell is checked. If the condition or color at step 156 is clear, then the process continues to step 158 and color 2 is selected. If color 1 is not the current color of the cell 50, then the process continues to step 162 and if that color is the current state then the next color is selected at step 164. However, if color 2 is not present at step 162, then the process inquires at step 168 if color 3 is present. If this is the case, then the color is changed to color 4 at step 170. But if at step 168 the color is not what is being selected, then it is presumed at 172 that the final color is the current condition and that is changed so as to return to color 1 at step 174. If some other signals are received, then the process returns to step 152. In this manner it can be seen that a user can simply click through the colors until the desired color is obtained.

Referring back to FIG. 4, it can be seen that the color can be changed in either the manual mode utilizing steps 106 and 108, or by initiating the auto mode at step 120 and then initiating steps 122 and 124.

Figure 7:
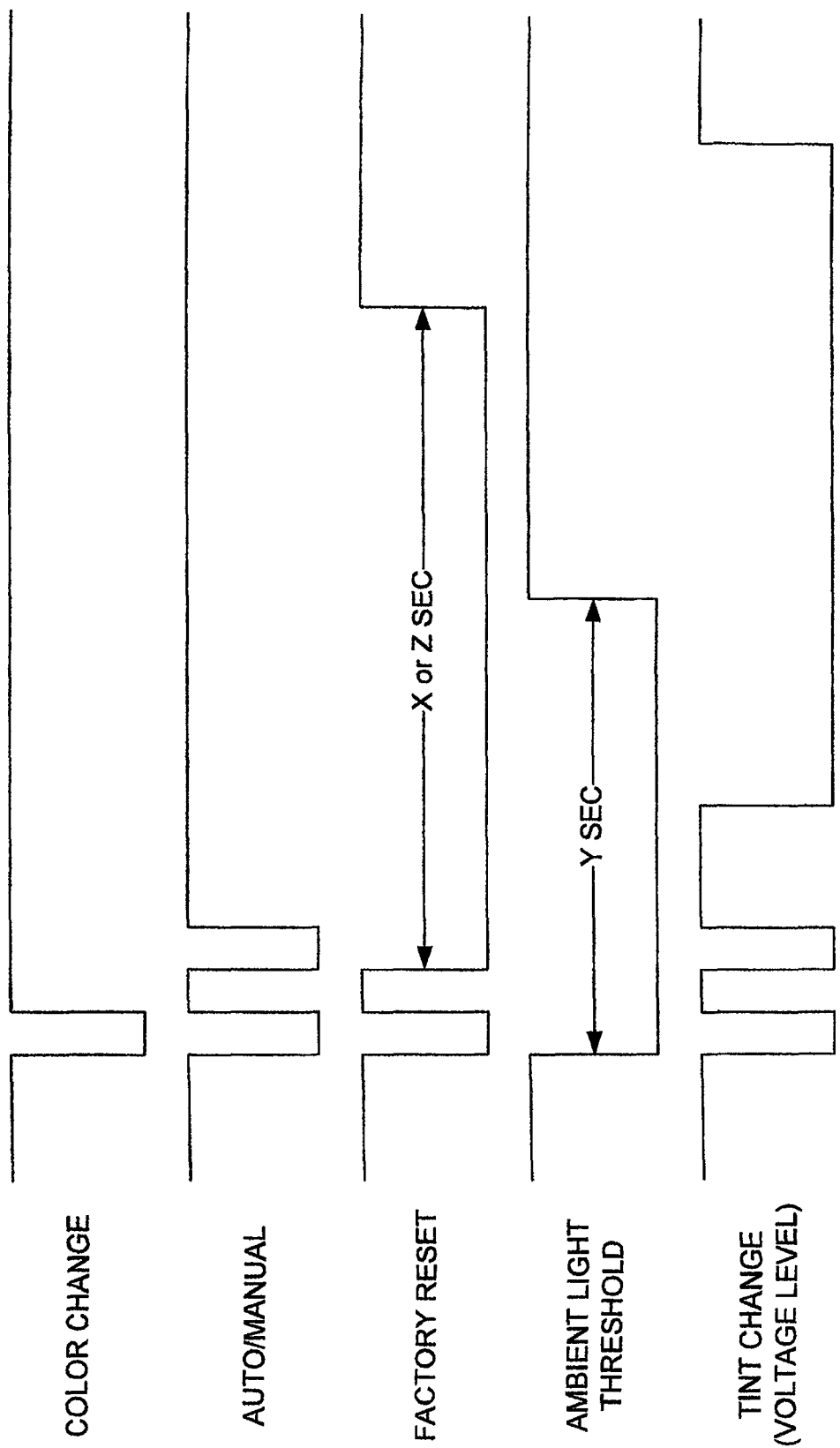
FIG. 7 is a diagrammatical representation of the flow chart in FIG. 4, showing an example of the various actuation sequences of the multi-functional control apparatus and the operational states associated with each sequence.

FIG. 7 is a diagrammatical representation of the flowchart in FIG. 4 and shows an example of the various actuation sequences of the multi-functional control apparatus in this example and the operational states associated with each sequence.

Example 2

Figure 8:
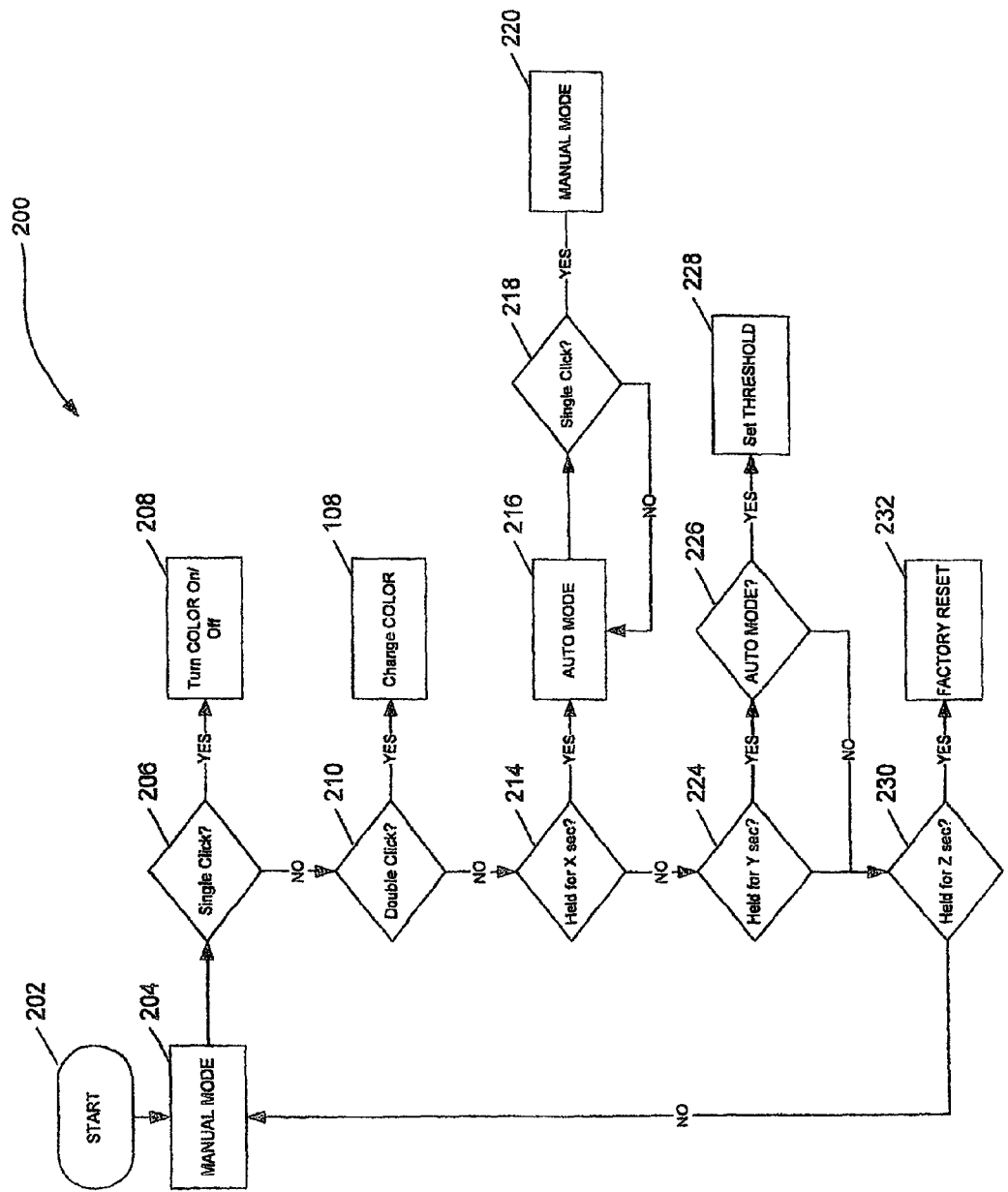
FIG. 8 is an alternative embodiment of an operational flowchart, showing alternative steps, implemented by the control circuit according to the concepts of the present invention.

Referring now to FIG. 8, an alternative embodiment of the operational method of the MCA utilized by the control circuit 48 is designated generally by the numeral 200. In this embodiment, the process starts at step 202 and subsequently defaults to the manual mode 204. If a single click is detected then a signal is generated by the microcontroller 64 to change the state or turn the sub-cells(s) on or off at step 208. In other words, if the condition of the cell 50 is a particular color, then that particular color is changed to a clear state or in the alternative, a clear state is changed to the desired colored state. If at step 206 a single click is not detected but a double click is detected, then at step 210 the color is changed from one state to another as set out in the change color operational steps 108 as shown in FIG. 5. However, if a double click is not detected at step 210 but the button is pressed and held for about x seconds, for example 2 seconds or other predetermined period of time, at step 214, then the control circuit 48 enters the auto mode at step 216. In the auto mode, actuation of a single click (step 218) causes re-entry into the manual mode. In this particular configuration, when the device is in the auto mode, the photosensor detects the ambient light level and changes the state of the cell 50 accordingly. However, the auto mode can be disengaged by a single click button actuation and the device returns to the manual mode at step 220.

Returning to step 214, if the button is held for about y seconds (step 224) or other predetermined period of time longer than the period of time set out in step 214, then the process enters the auto mode at step 226 and, if no further actions are taken, the threshold value is set at step 228 according to the observed ambient light in a manner similar to step 128. However, to reset the threshold level to the factory setting, the button can be pressed and held for Z seconds (which in this example is longer than y seconds), so that the process proceeds to step 230 and the factory reset procedure is implemented at step 232. If at step 230 the button is released prior to expiry of the designated time period, then the device returns to the manual mode 204.

FIG. 9 is a diagrammatical representation of the flow chart in FIG. 8, showing an example of the various actuation sequences of the multi-functional control apparatus in this example and the operational states associated with each sequence While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

What is claimed is:

1. An electronically controllable eyewear device, comprising:
    a cell comprising at least one liquid crystal material capable of changing from a first state of higher light transmittance when no voltage is applied to a second state of a lower light transmittance upon application of a voltage and vice versa;
    a photosensor associated with the cell, said photosensor generating an input signal based on ambient light level to operate said device in an auto mode;
    a single switch capable of being actuated in a series of predetermined sequences to generate a switch signal; and
    a control circuit capable of receiving said input signal said switch signal and being capable of generating a separate output signal to operate said cell
    wherein in said auto mode detection of an ambient light level above a predetermined threshold value results in said voltage being applied, and wherein detection of an ambient light level below said predetermined threshold value results in no voltage being applied;
    wherein actuation of said single switch in a first predetermined sequence enables (i) a state change of the liquid crystal material between said first and second states;
    wherein actuation of said single switch in a second predetermined sequence enables (ii) a system change from a manual mode to said auto mode; and
    wherein actuation of said single switch in a third predetermined sequence enables (iii) a change in said predetermined threshold value.

2. The device according to claim 1, wherein actuation of said single switch in said series of predetermined sequences is by using either a press and release or a press and hold for various periods of time.

3. The device according to claim 1, wherein actuation of said single switch in a fourth predetermined sequence enables (iv) a reset of said changed threshold value back to said predetermined threshold value.

4. The device according to claim 1, wherein actuation of said single switch in said first predetermined sequence when in the auto mode causes a system change from the auto mode back to the manual mode.

5. The device according to claim 1, wherein said cell comprises at least two stacked sub-cells, each sub-cell having a clear state and a color state, and
    wherein actuation of said single switch or a second switch in another predetermined sequence enables a device color change by changing a state of each said sub-cell from its said clear state to its said color state.

6. The device according to claim 5, wherein said device color change comprises changing said device color between at least a first color, a second color and a third color.

7. The device according to claim 1, wherein said cell comprises one cell and wherein actuation of said single switch or a second switch enables device tint change by changing the voltage supplied to said one cell so as to change a darkness level of said one cell.

8. The device according to claim 5, wherein actuation of said single or said second switch enables a device tint change by changing the voltage supplied to at least one of said sub-cells so as to change a darkness level of said sub-cell when said sub-cell is in a color state.

9. The device according to claim 1, wherein said single switch is movable from an open condition to a closed condition, said single switch biased to return to said open condition.

10. A method of controlling an electronically switchable eyewear device, comprising:
    providing a cell with an electro-optically active liquid crystal material, a photosensor associated with said cell that can generate an input signal based on a threshold ambient light level for operating the cell in an auto mode, a single switch capable of being actuated in a series of predetermined sequences to generate a switch signal, and a control circuit that receives said input signal and said switch signal and is capable of generating a separate output signal to operate said cell; and
    actuating said single switch in a series of predetermined sequences to enable three or more functions selected from:
    (i) a state change of said electro-optically active liquid crystal material from a clear state when no voltage is applied to a dark or colored state upon application of a voltage and vice versa;
    (ii) a system change from a manual mode to an auto mode;
    (iii) a change in said threshold ambient light level for generation of said input signal when in the auto mode; or
    (iv) a reset of said threshold ambient light level for the generation of said input signal to a factory setting
    wherein each function is enabled by one of said series of predetermined sequences, and
    wherein during said auto mode, said control circuit applies said voltage when said threshold ambient light level is above a predetermined threshold value and applies no voltage when said threshold ambient light level is below said predetermined threshold value.

11. The method according to claim 10, wherein said series of predetermined sequences comprise:
    pressing and releasing said single switch in a first predetermined period of time to obtain a first function;
    pressing and releasing said single switch twice within a second predetermined period of time to obtain a second function; and
    pressing and holding said single switch for a third period of time to obtain a third function,
    wherein each said first, second and third functions are selected from functions (i) to (iv).

12. The method according to claim 11, further comprising:
    pressing and releasing said single switch and then pressing and holding said switch for a fourth period of time to obtain a fourth function selected from any one of functions (ii) to (iv).

13. The method according to claim 10, further comprising:
    providing said cell with at least two stacked sub-cells, each sub-cell having a clear state and a color state, and
    actuating said single switch or a second switch in another predetermined sequence to change each said sub-cell between its said clear state and its said color state to obtain a device color change.

14. The method according to claim 13, wherein said device color change comprises changing said device color between at least a first color, a second color and a third color.

15. A multi-functional apparatus for controlling an electronically switchable eyewear device comprising:
   a cell comprising at least one liquid crystal-dye mixture
   a photosensor that generates an ambient light input signal for operation in an auto mode;
   a single switch that generates a switch signal, wherein said single switch is actuable in a series of predetermined sequences;
   a control circuit configured for use with said cell and capable of changing said liquid crystal-dye mixture between a high light transmittance clear state when no voltage is applied and a low light transmittance tinted state upon application of a voltage and vice versa, said control circuit adapted to receive said ambient light input signal and said switch signal and capable of generating a separate output signal to apply said voltage to said liquid crystal cell;
   wherein actuation of said single switch in a first predetermined sequence enables a state change of said liquid crystal cell from said clear state to said tinted state or vice versa, and
   wherein each said series of predetermined sequences enable a function selected from two or more of the following features of the optical device:
   a system change from a manual mode to an auto mode wherein during said auto mode, the control circuit applies said voltage to change the liquid crystal-dye mixture to said tinted state or applies zero voltage to return said liquid crystal-dye mixture to said clear state in response to said ambient light input signal;
   setting a threshold for generation of said output signal in response to said ambient light input signal;
   a reset of said threshold setting to a factory setting; or
   a color change.

16. The device according to claim 1, wherein said first second and third predetermined sequences are selected from one of:
   pressing and releasing said single switch in a first predetermined period of time;
   pressing and releasing said single switch twice within a second predetermined period of time; and
   pressing and holding said single switch for a third period of time.

17. The device according to claim 3, wherein said fourth predetermined sequence comprises pressing and holding said single switch for a fourth period of time.

18. The method according to claim 10, further comprising:
   actuating said single switch or a second switch in a predetermined sequence to enable a device tint change by changing a voltage supplied to said cell so as to change a darkness level of said cell.

19. The method according to claim 10, wherein said single switch is movable from an open condition to a closed condition, said single switch biased to return to said open condition.

20. The method according to claim 13, further comprising:
   actuating said single or second switch to enable a device tint change by changing a voltage supplied to at least one of said sub-cells so as to change a darkness level of said sub-cell when said sub-cell is in a color state.

21. The eyewear device according to claim 1, wherein said single switch is located on a frame or temple of said eyewear device.

22. The device according to claim 1, wherein the liquid crystal material can have an intermediate state of light transmission between said first and second states depending on application of a variable voltage.

23. The device according to claim 22, wherein the intermediate state of light transmission is associated with the amount of ambient light detected by said photosensor.

* * * * *